US007013235B2

(12) United States Patent

Hyyppä et al.

(10) Patent No.: US 7,013,235 B2
(45) Date of Patent: Mar. 14, 2006

(54) METHOD, APPARATUS AND PROGRAM FOR DETERMINING GROWTH OF TREES

(75) Inventors: Juha Hyyppä, Espoo (FI); Yu Xiaowei, Espoo (FI)

(73) Assignee: Geodeettinen Laitos, Masala (FI)

(*) Notice: Subject to any disclaimer, the term of this patent is extended or adjusted under 35 U.S.C. 154(b) by 26 days.

(21) Appl. No.: 10/803,966

(22) Filed: Mar. 19, 2004

(65) Prior Publication Data

US 2004/0236535 A1 Nov. 25, 2004

(30) Foreign Application Priority Data

Mar. 31, 2003 (FI) ................................ 20030479

(51) Int. Cl.
*G01B 15/00* (2006.01)
*G01B 11/02* (2006.01)
*G01B 11/22* (2006.01)

(52) U.S. Cl. ..................... 702/155; 702/159; 702/166; 33/1 A

(58) Field of Classification Search ............... 702/155, 702/150, 153, 157, 159, 166, 170; 33/1 A; 356/4.01, 5.01
See application file for complete search history.

(56) References Cited

U.S. PATENT DOCUMENTS

2005/0087110 A1 * 4/2005 Kobayashi et al. ......... 111/200

FOREIGN PATENT DOCUMENTS

| | | | |
|---|---|---|---|
| DE | 101 60 179 | A1 | 7/2003 |
| FI | 112402 | B | 11/2003 |
| WO | WO 0131290 | A | 5/2001 |
| WO | WO 02/071832 | A1 | 9/2002 |

* cited by examiner

*Primary Examiner*—John Barlow
*Assistant Examiner*—Meagan S Walling
(74) *Attorney, Agent, or Firm*—Birch, Stewart, Kolasch & Birch, LLP

(57) ABSTRACT

The present invention relates to a method of determining the growth of trees based on first and second measurement data obtained at different moments of time by utilizing a laser scanner located above the measured trees. In order to determine the growth of a large number of trees as fast and as easy as possible, said method comprises: processing said first measurement data in order to determine the location of tree locations (A), processing said second measurement data in order to determine the location of tree locations (B), determining the locations which are tree locations according to the results of both said first and second processing (C), and calculating the growth of trees at said determined locations by determining the difference in the size indicated by the second measurement data as compared to the size indicated by said first measurement data (D).

9 Claims, 4 Drawing Sheets

METHOD, APPARATUS AND PROGRAM FOR DETERMINING GROWTH OF TREES

This Nonprovisional application claims priority under 35 U.S.C. § 119(a) on Patent Application No(s). 2003-0479 filed in FINLAND on Mar. 31, 2003, the entire contents of which are hereby incorporated by reference.

BACKGROUND OF THE INVENTION

1. Field of the Invention

This invention relates to a solution for determining the growth of trees based on measurement data obtained at two different moments of time. Such measurement data can be obtained for instance by a laser scanner located above the trees.

2. Description of the Prior Art

Previous solutions for measuring the growth of trees are based on field measurements from the ground. Measurement equipment is thus transported to the location of a specific tree at two different occasions and the diameter or the height of the tree is measured from the ground. The obtained field measurement results are then compared to each other in order to determine the growth of the tree in question.

The above described prior art solution has the drawback that it is very slow. The number of trees which in practice can be measured is relatively small due to the time needed and costs involved in carrying out measurements.

Previously, for instance from WO-publication 01/31290, a solution is also known for obtaining a three-dimensional measurement result of stand attributes of trees located at a predetermined area. In this known solution, an aircraft, such as an airplane or a helicopter, is provided with measuring equipment which includes a laser scanner. Processing of the information obtained by the measuring equipment makes it possible to determine the size of the trees. This solution makes it possible to measure the size of a large number of trees during a relatively short period of time. So far, however, nobody has been able to disclose a solution for growth determination of trees where this known measurement solution is utilized. A significant problem has been the inaccuracy involved in the measurement. Present state of art methods do not utilize multi-temporal datasets in laser scanning. Even the use of pixel-based change detection methods and multi-temporal laser data sets will result in inaccurate growth estimates.

SUMMARY OF THE INVENTION

An object of the present invention is to solve the above mentioned drawback and to provide a solution which makes it possible to reliably determine the growth of trees significantly faster and in a more cost-effective way than in prior art solutions.

Another object of the present invention is to provide a solution which makes it possible to process three-dimensional measurement data collected from an area at two different occasions such that measurement results can be utilized in order to calculate the growth of trees in this area.

These and other objects of the invention are achieved with the method of independent claim 1, computer program of independent claim 6, and apparatus of independent claim 8.

In this application the phrase 'tree location' refers to, for instance, a location where a tree, the crown of a tree, or parts of the crown of a tree are located. In case several trees are located very close to each other, the location of such a group of trees is interpreted as a tree location. In that case the determined growth at this tree location reflects the growth of the tree group. In case of such a group of trees, also the tree-to-tree matching is in this case carried out by matching the groups of trees.

The invention is based on the idea that the measurement data collected at different occasions can be compared to each other when tree-to-tree matching is utilized. Tree-to-tree matching is carried out by, at first, identifying the tree locations separately from the first and second measurement data. Next, the locations, which according to both the first and the second measurement data are tree locations, are determined. The growth calculations are carried out only for such locations which are tree locations according to both the first and the second measurement data. This makes it possible to avoid errors resulting from positioning inaccuracy or from the fact that some of the trees in the area might have been cut or might have fallen between the moments of time at which the measurement data has been collected.

The most significant advantage with the present invention is considerable faster growth determination which make it possible to increase the number of trees whose growth is determined.

In a preferred embodiment of the present invention, the average growth of trees is calculated by comparing the growth at a plurality of tree locations with at least one predetermined threshold value in order to identify tree locations where the growth is such that an error can be suspected, and calculating said average growth without taking into account the growth at said identified tree locations. This preferred embodiment makes it possible to filter out such tree locations whose growth is such that an error can be suspected, and thus to calculate the average growth by taking into account only reliable values. This improves the accuracy of the average calculations.

Preferred embodiments of the method, computer program and apparatus of the invention are disclosed in dependent claims 2–5, 7 and 9.

BRIEF DESCRIPTION OF THE DRAWINGS

In the following, the present invention will be described in closer detail by way of example and with reference to the attached drawings, in which.

DESCRIPTION OF PREFERRED EMBODIMENTS

Figure 1:
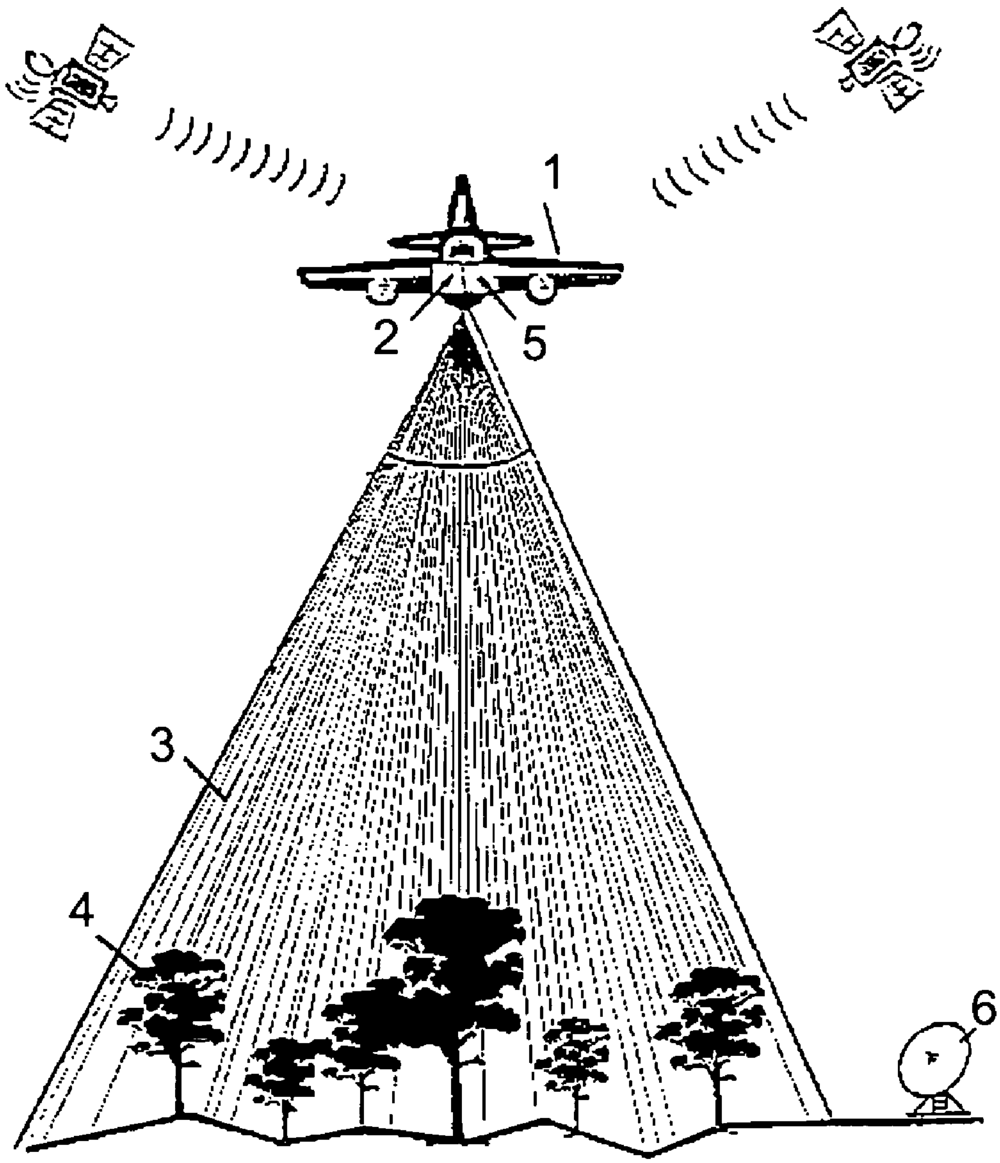
FIG. 1 is illustrates collection of three-dimensional data.

FIG. 1 illustrates an example of a solution for collecting three-dimensional data to be used in growth calculations.

In FIG. 1, three-dimensional measurement data is collected by utilizing an aircraft 1 which flies a predetermined route over the area where the growth determinations are to be carried out. The aircraft 1 is provided with measuring equipment including a laser scanner 2. The laser scanner comprises a laser gun for producing laser pulses and a detection unit, which records a received signal and determines the distance to a target. The time needed for the produced pulses to return to the laser scanner from the target is used for calculating the distance to the target.

The laser scanner 2 can be for instance a TOPOSYS-1 or TOPOSYS-2 laser scanner available from Topographische Systemdaten GmbH Wilhelm-Hauff-Strasse 41, D-88214 Ravensburg, Germany. Presently the measurements can be carried out for instance from an altitude in the range of 100 m to 1.5 km. If the altitude is for instance 800 m, the width of the area measured during one flight can be for instance 250 m. The measurements should be carried out such that laser beams hit the target substantially vertically. Tests have shown that incidence angles of more than 10° off-nadir result in a significant increase of shadowed areas.

The orientation and position of the laser scanner 2 is typically defined with an inertia navigation system and with GPS (Global Positioning System) measurements. The inertia navigation system measures either orientation alone or both the orientation and position by using at least one inertia sensor. The GPS measurements are typically conducted using one GPS receiver 5 in the aircraft and another GPS receiver 6 on the ground as a reference station, usually within a 30 km range from the area where the measurements are conducted.

The result of the measurements conducted with the solution of FIG. 1 is three-dimensional measurement data, in other words a group of X, Y, Z-coordinates covering the entire measured area. This group of coordinates describes the shape of the area as seen from above. The number of measurement results obtained from an area naturally depends on the properties of the measuring equipment used. Practical tests have, however, shown that a density of about 3–10 measurement results per $m^2$ is sufficient in order to identify individual trees from the measurement data.

Figure 2:
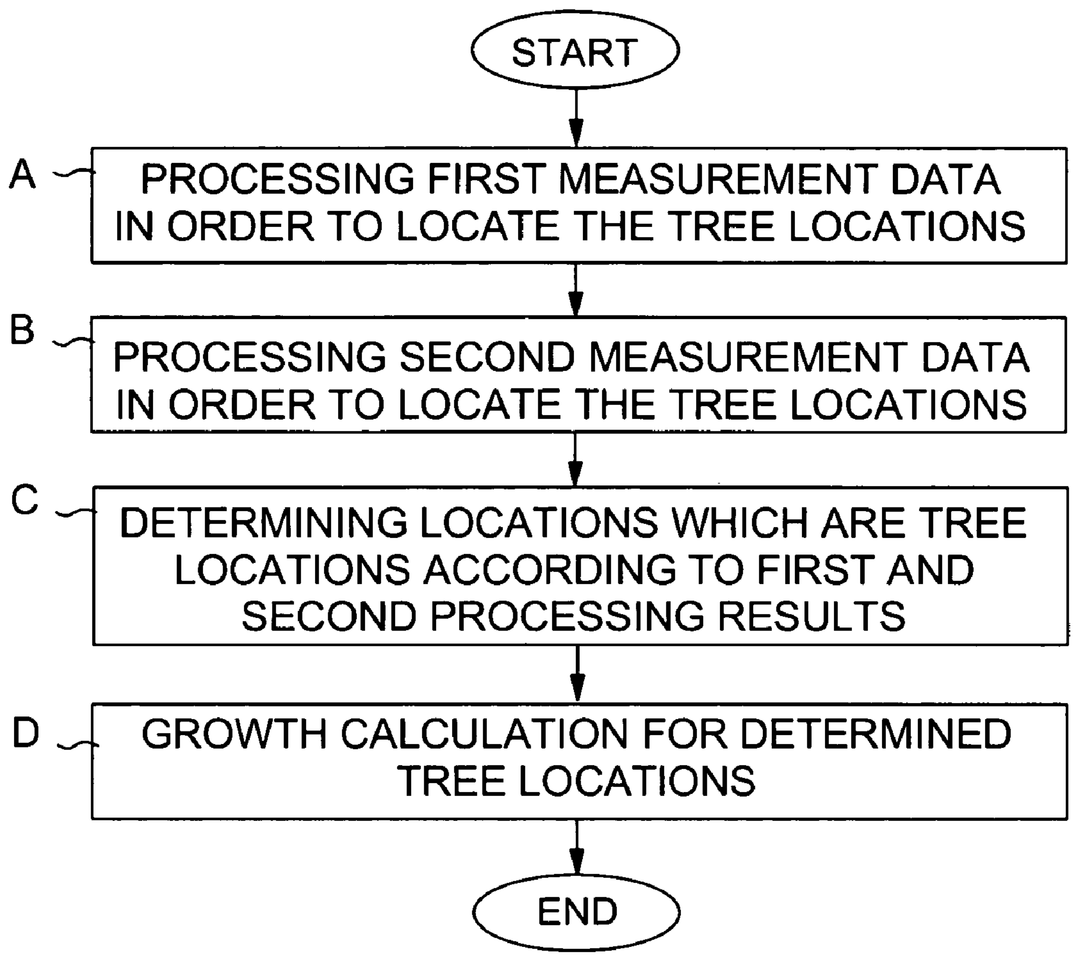
FIG. 2 is a flow chart of a first preferred embodiment of the invention.

FIG. 2 is a flow chart of a first preferred embodiment of the invention. The method illustrated in FIG. 2 can be used to process three-dimensional measurement data obtained from the same area at two different moments of time. The collecting of data and the processing of the measurement data should be made exactly in the same way in order to obtain a result which is as reliable as possible. Thus, for instance, it is advantageous if the aircraft could fly over the measured area by using the same flight paths both times. The algorithms used for processing the collected measurement data should also be exactly the same both times.

The collected first and second measurement data is processed in blocks A and B. The processing is the same in both blocks, thus both the first and the second measurement data is in turns processed as will be explained in the following.

A Tree Height Model (THM) is created as the difference between a Digital Surface Model (DSM) representing the top of the tree crowns and the Digital Elevation Model (DEM) representing the ground. This starts by generating the Digital Elevation Model (DEM) from the collected measurement data, for instance as described in WO-publication 01/31290. In this solution, the area covered by the measurement data is divided into pixels of suitable size, for instance 50 cm×50 cm. The Digital Surface Model (DSM) of the crowns is obtained by taking the highest value of all hits with each pixel (50 cm) and interpolating the surface model for missing pixels. In order to generate the Digital Elevation Model (DEM) from laser scanner data, the points that reflected from non-ground objects, such as trees and buildings, must be removed from the measurements. This can be accomplished by combining the high resolution Digital Elevation Model (DEM), which is generated by finding the minima of all the laser measurements belonging to each pixel area, with a low resolution one for identification and removal of non-ground points. This combination can then be repeated as often as necessary to generate a Digital Elevation Model (DEM) of the desired resolution. The procedure starts with a coarse resolution. Iteratively, the resolution is improved until the desired resolution is reached and a rough ground surface is created.

The created surface is usually lower than a real surface because of the action of taking the minimum value for each DEM pixel, especially in hilly areas. Thus, a final refinement is performed to take return the original laser scanner data of the ground points and by comparing laser measurements with the corresponding values of the created surface and use the data in the final interpolation of DEM.

The created Tree Height Model (THM) can be used for locating tree locations. The positions (X, Y coordinates) of the local Z maximum values (Z value describing the height of a tree at coordinates X, Y) represent the locations of the tree locations. Preferably, the Tree Hight Model is low-pass filtered before the local maximum search in order to reduce the number of detected tree locations.

There are several methods to locate tree locations. Image processing techniques allow e.g. segmentation and crown delineation. With these knowledge you can calculate the center of the crown, the mass center of the crown and crown area. These techniques, also including morphological image analysis, are extensively reported in existing knowledge (books, scientific papers). In this new invention, all these techniques are applicable and do not change the basic novelty. All these techniques applied to distinguish tree locations are later on called as methods to locate the tree locations, for simplicity. The result is the tree locations according to the first measurement data (in block A) and the tree locations according to the second measurement data (in Block B).

In block C, a search is carried out in order to determine such locations which are tree locations according to the processing of both the first and the second measurement result. If one of the processing results indicates that a specific location is a tree location but the other processing result indicates that the specific location is not a tree location, no growth calculation is carried out for that location. This tree-to-tree matching helps to ensure that growth calculations are carried out only for such locations which according to both processing results are tree locations, in practice the tree locations of the same tree or group of trees.

The tree-to-tree matching can also be done with the help of crown areas. By overlaying the crown areas it is possible to calculate e.g. the distance between the mass centers of the crown area. This application assumes that the tree-to-tree matching by this mean is included in the used term "determining the locations which are tree locations according to both said first and second processing results".

The tree-to-tree matching carried out in block C eliminates from the growth calculations, for instance, tree locations were trees have been cut or were trees have fallen between the occasions when the two measurement results were obtained.

Finally, in block D, the growth calculations are carried out for the locations which have been determined to be tree locations. The growth calculation can be executed by calculating the height difference extracted from the two Tree Height Models (THM) for the given location. If the goal is to calculate the average growth in a given area, it can be carried out by subtracting the average of heights obtained for the two measurement results for all matched tree locations.

The growth calculation can also be done in other ways. By using the image processing methods, e.g. segmentation to define the measured values or point clouds referring to each single tree (or group of trees), it is possible to compare the point clouds of the first and second measurement data. Since laser hits do not properly penetrate into crowns, the point cloud represents the profile of each tree. By overlaying the profiles corresponding the first and second measurement, it is possible to reliable estimate the systematic shift of the profiles, which is due to horizontal or vertical growth of the trees. Also, depending on the laser point density on the trees and homogeneity of the stands, other statistical features (e.g. mean, median, histogram) can lead to improved accuracy in height determination. The growth calculations can thus, for instance, be done by calculating the difference of profiles, by calculating the vertical or horizontal difference of tree height models or by calculating the difference between the means of laser points for said first and second measurement data.

Terrain elevations can be expected to be stable between the two occasions when the measurements were carried out. Therefore, the DEM created from two separate measurement results should result in the same elevation model. However, because Tree Height Model is the difference between the Digital Surface Model representing the top of the tree crowns and the Digital Elevation Model representing the ground, systematic errors will not show in the Tree Height Model, but random errors in DEM will propagate to Tree Height Model and therefore to the growth calculations. The effect of errors in DEM can be compensated in one of the measurement results as follows:

Systematic error of the two data sets can be determined for instance by measuring elevations of road surfaces. The measured difference can be compensated in one of the measurement results.

The DEM value and difference between the two measurement results can be calculated for each matched tree, and the growth can be compensated with the difference of the DEMs for each matched tree.

Figure 3:
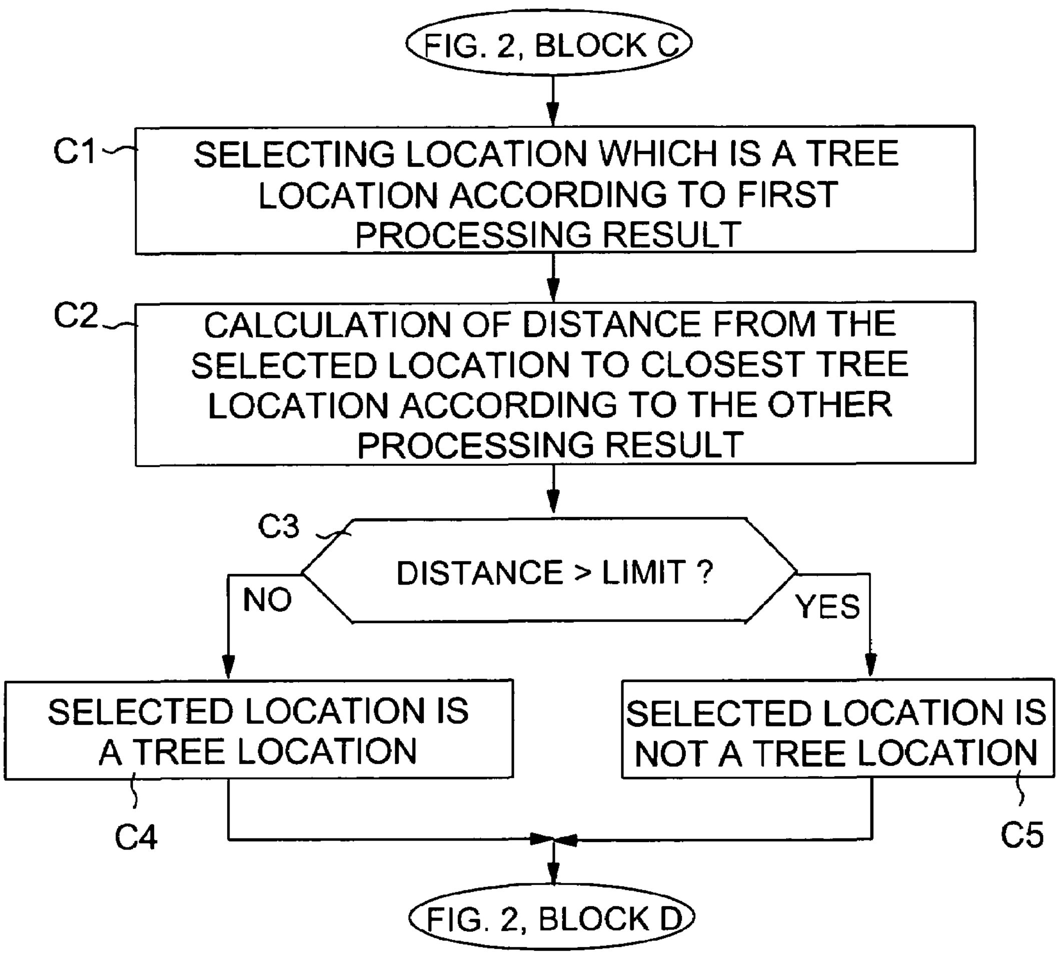
FIG. 3 is a flow chart of a second preferred embodiment of the invention.

FIG. 3 is a flow chart of a second preferred embodiment of the invention. The solution of FIG. 3 can be used in the tree-to-tree matching described in connection with block C of FIG. 2.

In block C1, the location, which according to one of the processing results (in this example the first processing result) is a tree location, is selected.

In block C2, distance calculations are carried out in order to determine the minimum distance between the selected tree location and the location of the closest tree location according to the other processing result (in this example the second processing result).

In block C3, the calculated distance DISTANCE is compared to a predetermined limit LIMIT. If the distance is smaller than the limit, it is determined in block C4 that both processing results indicate that the location in question is a tree location. Otherwise it is determined in block C5 that the location in question is not a tree location.

The solution of FIG. 3 has the advantage that the effect of small positioning errors regarding the tree locations can be eliminated. Setting the limit value LIMIT at 0.5 m, for instance, makes it possible to detect a tree match (a tree location according to both processing results) at a specific location even though there is a positioning error of 0.5 m in the measurement data.

Figure 4:
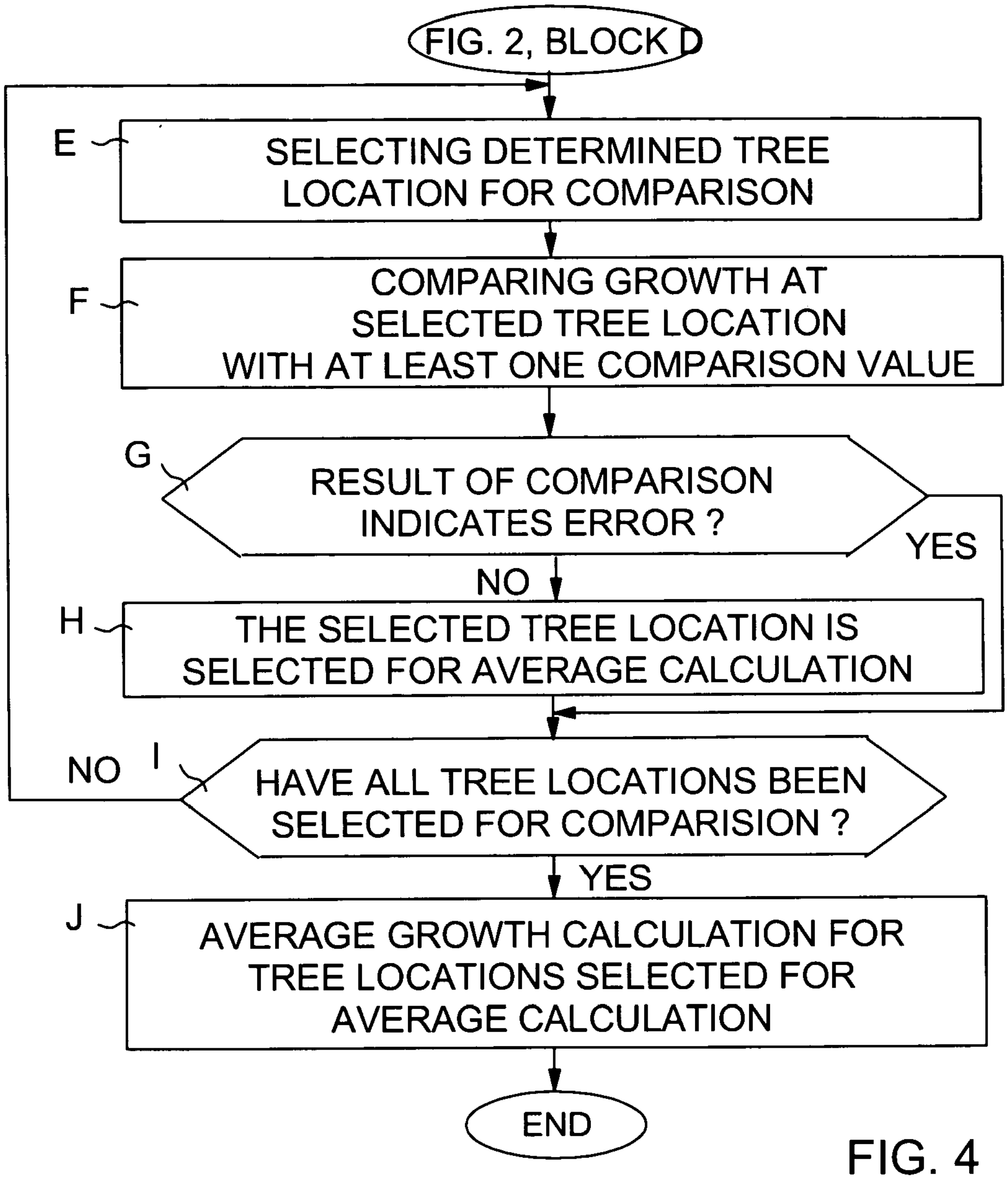
FIG. 4 is a flow chart of a third preferred embodiment of the invention.

FIG. 4 is a flow chart of a third preferred embodiment of the invention. This embodiment makes it possible to minimize possible errors in the measurement of the growth at single tree locations when the average growth calculations are carried out. This improves the accuracy of the average calculations.

In block E a determined tree location is selected for comparison. Preferably, the process of FIG. 4 is repeated until all tree locations have been systematically processed according to the indicated steps.

In block F, the growth at the selected location is compared with at least one comparison value and in block G, a check is carried out to determine whether the comparison indicates an error. The object is to identify tree locations where the determined growth is unrealistic. The number of comparison values and the value of these comparison values are selected with this in mind. An alternative is to use a first comparison value=0, and to determine that an error exists for each tree location where the determined growth is equal to or less than zero. This is naturally a clear indication of an error, as it should not be possible that a tree becomes smaller by growth. A second comparison value can also be selected to identify tree locations where the growth exceeds what is assumed to be realistic when taking into account the time period between the collection of the first and the second measurement data. For instance, it can be assumed that an error exists if the determined growth at a tree location is more than 1 m when the time period is one year.

If it is determined in block G that the result of the comparison indicates an error, the tree location in question is not selected for average calculations but instead, a check to see whether all tree locations have already been processed is carried out in block I.

Finally, when all tree locations have been processed, block J is entered. In block J, an average growth is calculated for the tree locations selected for average calculations in block H.

Figure 5:
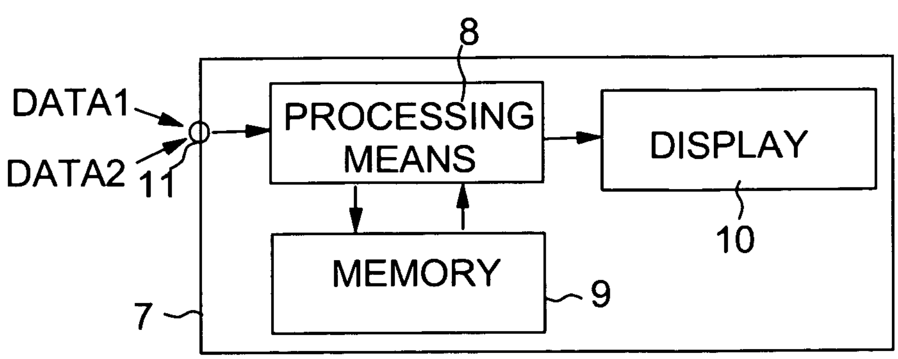
FIG. 5 is a block diagram of an apparatus according to the present invention.

FIG. 5 is a block diagram of an apparatus according to the present invention. The apparatus 7 of FIG. 5 can in practice consist of an ordinary Personal Computer (PC) programmed to carry out the growth calculations according to the method explained in connection with the previous FIGS. 2 to 4.

The apparatus 7 has an input 11 for receiving first three-dimensional measurement data DATA1 and second three-dimensional measurement data DATA2. The data and the program used for processing the data is stored in memory 9. The processing means 8 carry out the processing and output the result of the growth calculations to a display 10. Alternatively or in addition to the display the result can also be outputted to some other computer peripherals, such as to a printer or written to a file in a disk.

It is to be understood that the above description and the accompanying figures are only intended to illustrate the present invention. It will be obvious to those skilled in the art that the invention can be varied and modified also in other ways without departing from the scope and spirit of the invention disclosed in the attached claims.

What is claimed is:

1. A method of determining the growth of trees comprising:

obtaining first measurement data at a first moment of time by utilizing a laser scanner located above the trees, obtaining second measurement data at a second moment of time by utilizing a laser scanner located above the trees, processing said first measurement data in order to determine the location of tree locations, processing said second measurement data in order to determine the location of tree locations, determining the locations which are tree locations according to both said first and second processing results, and calculating the growth of trees at said determined locations by determining the difference in the size indicated by the second measurement data as compared to the size indicated by said first measurement data.

2. A method according to claim 1, wherein said determining of the locations which are tree locations according to the results of both said first and second processing is carried out by tree-to-tree matching involving:

selecting a location which according to one of said first and second processing results is a tree location, calculating the distance from said selected location to the closest location which according to the other one of said first and second processing results is a tree location, and determining that the result of both said first and second processing indicates said selected location is a tree location, if the calculated distance does not exceed a predetermined minimum distance.

3. A method according to claim 1, comprising estimating the average growth of trees in a specific area based on average growth calculated based on the calculated growth at a plurality of tree locations.

4. A method according to claim 1, wherein average growth is calculated by:

comparing the growth at a plurality of tree locations with at least one predetermined threshold value in order to identify tree locations where the growth is such that an error can be suspected, and calculating said average growth without taking into account the growth at said identified tree locations.

5. A method according to claim 1, wherein growth calculation is carried out by calculating the difference in profile of the trees as indicated by a plurality of measurement values obtained from a tree location, or by calculating the vertical or horizontal difference of the trees as indicated by the measurement data.

6. A computer program for controlling a computer to:

receive first three-dimensional measurement data, receive second three-dimensional measurement data, process said first measurement data in order to determine the location of tree locations, process said second measurement data in order to determine the location of tree locations, determine the locations which are tree locations according to the results of both said first and second processing, calculate the growth at said determined locations by determining the difference in the size indicated by the second measurement data as compared to the size indicated by said first measurement data, and produce a result indicating at least said calculated growth.

7. A computer program according to claim 6, wherein said computer program is configured to control a computer to calculate average growth by:

comparing the growth at a plurality of tree locations with at least one predetermined threshold value in order to identify tree locations where the growth is such that an error can be suspected, and calculating said average growth without taking into account the growth at said identified tree locations.

8. An apparatus for determining the growth of trees, said apparatus comprising:

an input for receiving first three-dimensional measurement data and second three-dimensional measurement data, and processing means, said apparatus being arranged to:

process said first measurement data with said processing means in order to determine the location of tree locations, process said second measurement data with said processing means in order to determine the location of tree locations, determine the locations which are tree locations according to the results of both said first and second processing, calculate the growth of trees at said determined locations with said processing means by determining the difference in the size indicated by the second measurement data as compared to the size indicated by said first measurement data, and produce a result indicating at least said calculated growth.

9. An apparatus according to claim 8, wherein said apparatus is arranged to calculate average growth by:

comparing the growth at a plurality of tree locations with at least one predetermined threshold value in order to identify tree locations where the growth is such that an error can be suspected, and calculating said average growth without taking into account the growth of at said identified tree locations.

* * * * *